72470
A. Ellis & C. Albertson's Animal-Trap.
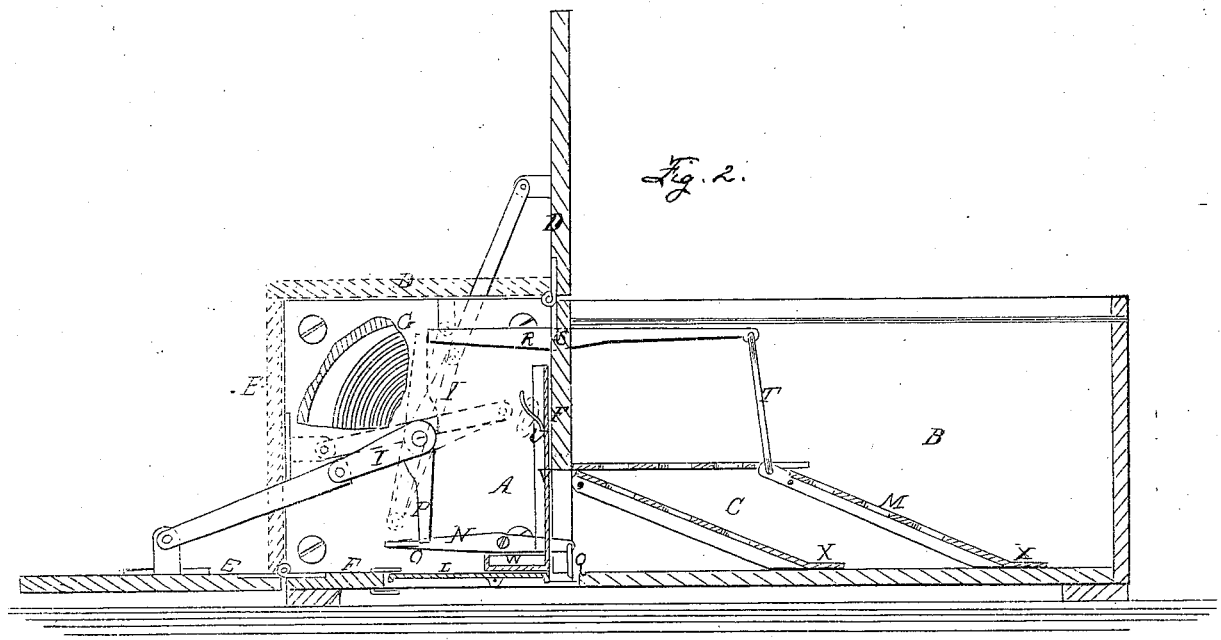
Fig. 2.
PATENTED
DEC 24 1867
Fig. 1.
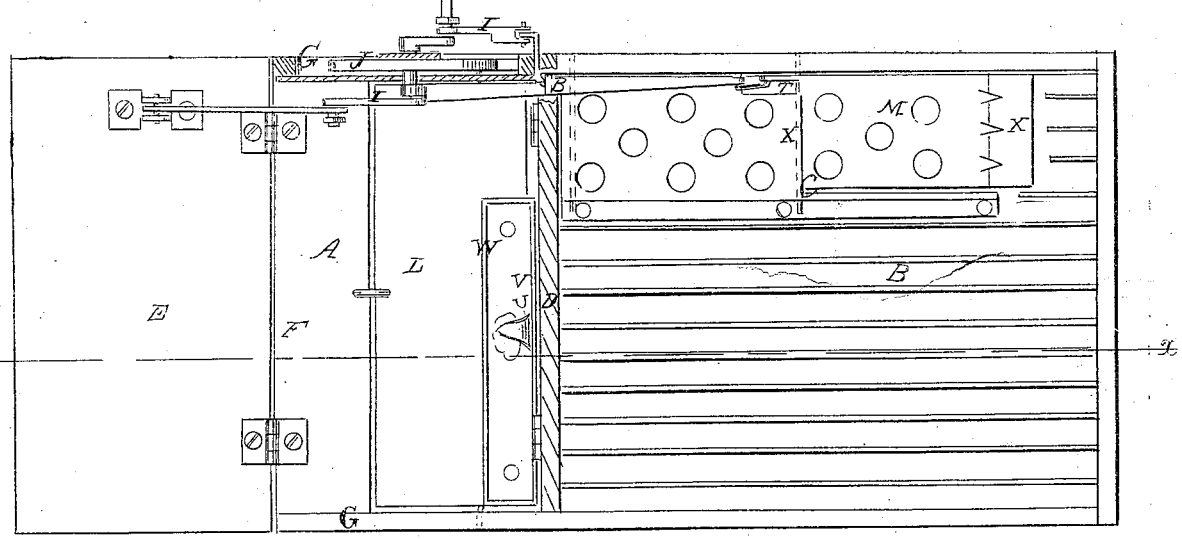
Witnesses.
Inventor:
A. Ellis
C. Albertson

United States Patent Office.

AUGUSTIN ELLIS AND OLIVER ALBERTSON, OF SALEM, INDIANA.

Letters Patent No. 72,470, dated December 24, 1867.

---

IMPROVED ANIMAL-TRAP.

---

The Schedule referred to in these Letters Patent and making part of the same.

---

TO ALL WHOM IT MAY CONCERN:

Be it known that we, AUGUSTIN ELLIS and OLIVER ALBERTSON, of Salem, in the county of Washington, and State of Indiana, have invented new and useful Improvements in Animal-Traps; and we do hereby declare that the following is a full, clear, and exact description thereof, which will enable others skilled in the art to make and use the same, reference being had to the accompanying drawings, forming part of this specification.

The present invention relates to that class of animal-traps in which are combined two boxes or chambers, the one being the bait-chamber, and the other the box or cage into which the animal caught in the bait-chamber by the operation of the trap passes through a suitable communicating passage, setting the bait-chamber again for trapping another animal; and this invention consists in a novel construction and arrangement of the trap, which will be hereafter described, whereby many important advantages and features are secured, to be hereinafter enumerated. In the accompanying plate of drawings, our improvements in animal-traps are illustrated—

Figure 1 being a plan or top view of a trap made according thereto, and

Figure 2 a longitudinal vertical section of the same, taken in the plane of the line $x\,x$, fig. 1.

A, in the drawings, represents the bait-chamber or box to the trap, and B the box into which the animals caught in the trap pass from the bait-chamber through the passage C forming the communication between them. The top D and front board E to the chamber A are hinged to the other portion, F, of the box, so as to open and close upon the end pieces G, the two, when opened, coming, the one, D, into a vertical position, and the other, E, into a horizontal position, or thereabout, in each case. Both the lids, D and E, are connected to crank-arms I of a common shaft or spindle H, arranged to turn in one of the end pieces, G, one crank being on the outside of the box, and the other on the inside. This shaft, H, is connected to the inner end of a coiled spring, J, surrounding it, that by its outer end is fixed, so that, being tightly wound around the shaft, it will, by uncircling, alternately open and close the lids D and E upon the end pieces G, without it is stopped at the end of the opening and closing movements of the trap-lids, for which purpose connections are made, as will be now described, between the tilting-platform L of the bait-chamber, in the one instance, and the swinging door M of the communicating passage hereinbefore referred to in the other instance. N, a lever-stop, hung to the inside of the end piece G, carrying the coiled-spring spindle, with one end provided with a shoulder, O, suitable to hold the said spindle from turning when brought into connection with the arm P to such spindle, and with its other end hung through a link, Q, to the inner edge of the tilting-platform. R, a lever-arm, hung to turn upon a fulcrum at S of the sides to the box B, and at one end connected, through a rod, T, with the door to the communicating passage. This lever holds the lids in a closed position by the abutment of the spindle-arm P, hereinbefore referred to, against the same, until, being released from such arm by the raising of the door, as the animal passes through the communicating-passage C, the action of the coiled spring opens the lids, and thus again sets the trap, as is obvious. The depression of the tilting-platform by the weight of the animal thereon sets the coiled spring free to act to close the lids. U, the bait-hook, which is, at the upper end to a frame, V, secured to the tilting-platform, which frame, at its lower end, has a box, W, formed for holding loose bait. To the communicating passage two doors are provided, so as to all the more obstruct any attempt of the animal to pass back into the bait-chamber from the box or chamber B; and to still further provide against such opening of the said doors, they are made with flange-strips X, to rest upon the floor of the box. The wicket-doors to the passage between chambers A and B are provided with prongs, to prevent a back return of the animals. In lieu of a coiled spring, a weight may be used for opening the lids.

Among the many advantages secured by our improvements may be here mentioned, first, that when the doors or lids are opened, the whole end of the trap is uncovered, thus presenting great inducements for animals to enter; second, that the motion of the doors in operation, either in opening or shutting—one going upwards and the other downwards in opening, and *vice versa* in shutting—is calculated to impart steadiness to its motion, when driven either by a spring or weight; third, that, by the two wicket-doors to the communicating passages, the difficulty, sometimes experienced, of each animal resetting the trap after being caught—a very large one sometimes resetting the trap before fully entering the light-chamber or box C, and then turning back—is entirely prevented, the first one being disconnected from the machinery, and only comfortable room being allowed for an animal, and intended, between it and the other door; fourth, the treadle is constructed to occupy the whole end of the trap, which, if the animal enters at all, he will throw it, and, after being caught, cannot return, under any circumstances, from the back chamber without stepping on it, and, if open, closing the doors, retaining him from escaping.

Having thus described our invention, we claim as new, and desire to secure by Letters Patent—

1. The combination of the lids D E to the bait-box A, tilting-platform L, wicket-door M, between said bait-box and the chamber B, lever-stop N, bar P, lever S, rod T, crank-arms I, crank-shaft H, spring J, and bait-hook and frame U V, substantially as described for the purpose specified.

2. The wicket-door or doors to the communicating passage C, provided with a flange-piece or strip, or its equivalent, substantially as described for the purpose specified.

AUGUSTIN ELLIS,
OLIVER ALBERTSON.

Witnesses:
GEORGE W. SMITH,
W. ASTON.